United States Patent [19]
Tojima et al.

[11] Patent Number: 4,949,829
[45] Date of Patent: Aug. 21, 1990

[54] CLUTCH COVER ASSEMBLY WITH ANNULAR CONED DISC SPRING

[75] Inventors: Hiromi Tojima; Hiroshi Minakami; Yasuyuki Hashimoto; Mamoru Okubo; Ikuo Murata; Hiroshi Takeuchi, all of Neyagawa, Japan

[73] Assignee: Kabushiki Kaisha Daikin Seisakusho, Neyagawa, Japan

[21] Appl. No.: 360,914

[22] PCT Filed: Aug. 2, 1988

[86] PCT No.: PCT/JP88/00773
§ 371 Date: Apr. 6, 1989
§ 102(e) Date: Apr. 6, 1989

[87] PCT Pub. No.: WO89/01096
PCT Pub. Date: Feb. 9, 1989

[30] Foreign Application Priority Data
Aug. 3, 1987 [JP] Japan .................. 62-119886[U]
Apr. 1, 1988 [JP] Japan .................. 63-45150[U]
Apr. 18, 1988 [JP] Japan .................. 63-51732[U]

[51] Int. Cl.⁵ .................... F16D 13/44; F16D 19/00
[52] U.S. Cl. .................... 192/89 B; 192/70.27
[58] Field of Search .................... 192/89 B, 70.27

[56] References Cited

U.S. PATENT DOCUMENTS

| | | | |
|---|---|---|---|
| 3,739,896 | 6/1973 | Shono | 192/89 B |
| 3,785,466 | 1/1974 | Murai et al. | 192/89 B |
| 3,811,544 | 5/1974 | Maucher | 192/89 B |
| 3,963,105 | 6/1976 | Ernst et al. | 192/89 B |
| 3,977,504 | 8/1976 | Kajitani | 192/89 B |
| 4,069,905 | 1/1978 | DeGennes | 192/89 B |
| 4,195,719 | 4/1980 | Martinez | 192/89 B |
| 4,602,708 | 7/1986 | Nagano | 192/70.27 |
| 4,641,736 | 2/1987 | Förster | 192/70.27 |

FOREIGN PATENT DOCUMENTS

2029334 6/1970 Fed. Rep. of Germany .... 192/89 B
59-166725 9/1984 Japan .

Primary Examiner—Rodney H. Bonck
Assistant Examiner—Nicholas Whitelaw
Attorney, Agent, or Firm—Armstrong, Nikaido, Marmelstein, Kubovcik & Murray

[57] ABSTRACT

In a clutch cover assembly including a diaphragm spring and a coned disc spring, circumferential plural places of the coned disc spring are secured to projecting portions provided on a clutch cover in such a manner as leaving no play at least in a circumferential or axial direction. Since there is no clearance between secured portions of the coned disc spring and projecting portions of the clutch cover, the coned disc spring can be prevented from emitting abnormal sound due to its axial or circumferential vibration.

7 Claims, 4 Drawing Sheets

CLUTCH COVER ASSEMBLY WITH ANNULAR CONED DISC SPRING

TECHNICAL FIELD

This invention relates to a clutch cover assembly in which a main diaphragm spring (abbreviated merely to a diaphragm spring hereinunder) and a sub diaphragm spring (abbreviated merely to a coned disc spring hereinunder) are installed for serving as a diaphragm spring mechanism, and especially to a supporting mechanism of the coned disc spring.

BACKGROUND ART

The clutch cover assembly of the foregoing type has been described in Published Utility Model Application No. 58-157030 applied for patent by the applicant of this invention. In that structure, a large-size main diaphragm spring (abbreviated merely to a diaphragm spring hereinunder) connected to a pressure plate and a sub diaphragm spring (abbreviated merely to a coned disc spring hereinunder) are installed in a diaphragm spring mechanism.

A general diaphragm spring has a characteristic that a deflection load increases when a deflection amount decreases from some value to a specified value and the deflection load decreases when the deflection amount decreases further.

For this reason, in a general structure in which only the diaphragm spring is used as the diaphragm spring mechanism, when the friction facing is worn out, a deflection load of the diaphragm spring increases with a decrease in a deflection amount of the diaphragm spring at the time of clutch engagement. As the result, an urging force effected from the diaphragm spring on a pressure plate increases so that a required treading force of a clutch pedal increases too.

On the contrary, in the structure of the foregoing application, the deflection load of the coned disc spring varies so as to counteract the increase in the load of diaphragm spring. As the result, the urging force effected from the diaphragm spring on the pressure plate is maintained at approximately a constant value so that the required treading force of the clutch pedal is also maintained at an approximately constant value.

However, the coned disc spring is not locked in its rotating direction in the structure of the foregoing application, so that the coned disc spring would rotate in relation to other members to cause an emission of abnormal sound under a state where the deflection load is not applied on the coned disc spring, i.e. under a clutch disengaged state. Further, since the coned disc spring is not supported in its axial direction, some axial play would be produced so that the coned disc spring would vibrate in its axial direction to cause the emission of abnormal sound.

DISCLOSURE OF INVENTION

In order to solve the above-mentioned troubles in this invention, an outer peripheral edge of a diaphragm spring is pressed on a pressure plate, an inner peripheral edge thereof is connected to a release bearing mechanism, a disc-like annular coned disc spring is disposed at an axial one-side of the diaphragm spring, the coned disc spring is secured to a clutch cover in such a manner that circumferential plural places of the coned disc spring are provided so as not to leave any play relatively to projecting portions of the clutch cover at least in its axial or circumferential direction, the coned disc spring is so installed that an outer peripheral edge or an inner periperal edge thereof contacts with the diaphragm spring to urge the diaphragm spring in a direction to disengage a clutch at a time when the clutch is engaged, a radial intermediate point of the diaphragm spring is supported by the clutch cover through means of a fulcrum mechanism.

Further, the present invention can control abnormal sounds generated by at least axial or circumferential vibration of the coned disc spring.

BEST MODE FOR CARRYING OUT THE INVENTION

Figure 1:
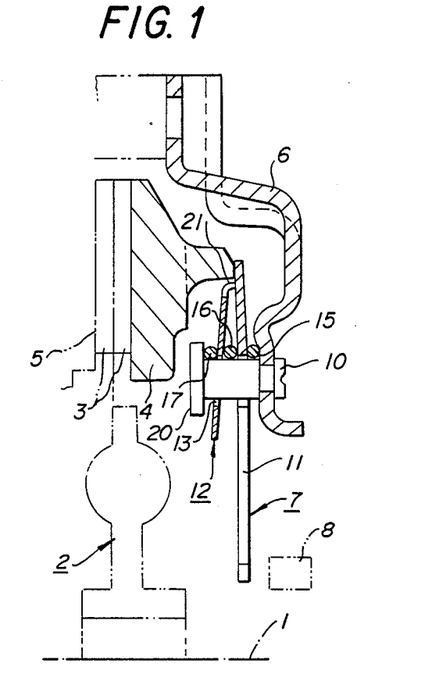
FIG. 1 is a vertical sectional partial view of an embodiment.

In FIG. 1, a facing 3 is secured to an outer peripheral part of a clutch disc 2 coupled to an output shaft 1, and the facing 3 is adapted to be pressed on a flywheel 5 by a pressure plate 4. An outer periphery and a backside face of the pressure plate 4 are covered by a clutch cover 6. The clutch cover 6 is secured to the flywheel 5 at its outer peripheral part. The pressure plate 4 is connected to the clutch cover 6 by a leaf spring (not shown) in such a manner that the plate 4 can not move in both circumferential and axial directions relatively to the clutch cover 6. An annular diaphragm spring 7 is installed in between the clutch cover 6 and the pressure plate 4. An outer pheripheral edge of the diaphragm spring 7 is seated on a projection of the backside face of the pressure plate 4.

A release bearing 8 is installed at a position facing on an inner peripheral part of the diaphragm spring 7 opposite to the clutch disc 2. The release bearing 8 is interconnected to a clutch pedal through a connecting mechanism not shown.

One-ends of stud pins 10 (only one being illustrated) are secured to the inner peripheral part of the foregoing clutch cover 6 at plural places spaced in a circumferential direction. The stud pin 10 is parallel to the output shaft 1 and protrudes from the clutch cover 6 toward the clutch disc 2 side. The diaphragm spring 7 has a radial slit 11 from its inner periphery to a radial intermediate portion, and the stud pin 10 passes through an enlarged portion formed at a radial outside end of the slit 11. The stud pin 10 supports inner peripheries of wire rings 15, 16 & 17. The wire rings 15 & 16 extend in the circumferential direction of the diaphragm spring 7 and are seated on both sides of the diaphragm spring 7.

A coned disc spring 12 is arranged next to the diaphragm spring 7. An external diameter of the coned disc spring 12 is made a little smaller than an external diameter of the diaphragm spring 7, and its internal diameter is made approximately same as an internal diameter of the clutch cover 6. The coned disc spring 12 is positioned at the clutch disc 2 side of the diaphragm spring 7. The foregoing stud pins 10 pass through plural openings 13 (FIG. 2) arranged in the circumferential direction of the coned disc spring 12 with appropriate spaces left therebetween. The foregoing wire ring 16 is positioned between the both springs 7 & 12. The stud pin 10 has an outward flange 20 at its front end, and the wire ring 17 is interposed between the flange 20 and the coned disc spring 12. The wire ring 17 also has the same dimension and shape as the wire rings 15 & 16, and its inner periphery is supported by the stud pin 10. Incidentally, the said wire ring 15 is interposed between the diaphragm spring 7 and an inside face of the clutch cover 6.

Figure 2:
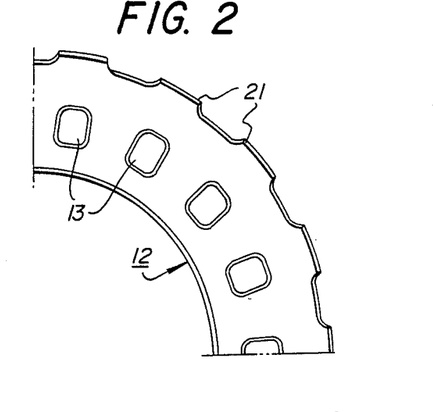
FIG. 2 is a partial plane view of a coned disc spring of FIG. 1.

A bent portion 21 is formed at an outer peripheral part of the coned disc spring 12. The bent portion 21 bends from an annular body of the coned disc spring 12 to the diaphragm spring 7 side, and its tip end is seated on the diaphragm spring 7. This bent portion 21 is formed at plural places of the annular body of the coned disc spring 12 with appropriate spaces left therebetween in the circumferential direction.

Characteristics and relative positions of the foregoing both springs 7 & 12 are so settled as follows.

In a state where the diaphragm spring 7 is set free from the release bearing 8 as illustrated by FIG. 1, the diaphragm spring 7 pushes the pressure plate 4 toward the facing 3 side by means of its own elasticity, thereby the pressure plate 4 presses the facing 3 on the flywheel 5 to cause the clutch to be kept in its engaged state.

An axial position of the pressure plate 4 under this engaged state is shifted to the flywheel 5 side with an increase in a wear of the facing 3. For this reason, a position of the outer peripheral part of the diaphragm spring 7 under the clutch engaged state is also shifted to the same side (its inner peripheral part being shifted in the opposite direction) with the increase in the wear of the facing 3, and a deflection amount of the diaphragm spring 7 decreases.

On the other hand, portions where the both springs 7 & 12 contact with the wire rings 15 through 17 can not move in the axial direction. Consequently, when the position of the outer peripheral part of the diaphragm spring 7 changes as described above under the clutch engaged state, the coned disc spring 12 is compressed in the axial direction to increase the deflection amount.

Figure 3:
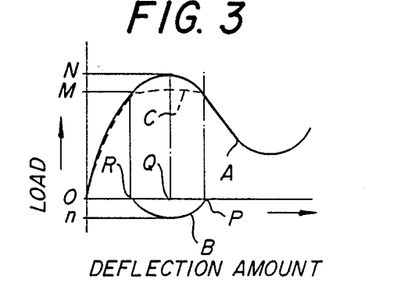
FIG. 3 is a deflection/load characteristic curves of a diaphragm spring and the coned disc spring.

While, in the graph of FIG. 3, a solid line A is the deflection/load characteristic curve of the diaphragm spring 7 and a solid line B is the deflection/load characteristic curve of the coned disc spring 12. Further, an axis of abscissa indicates the deflection amount, and in a less abstract way an arrow next to the abscissa shows a direction of increase in the deflection amount of the diaphragm spring 7 and that of decrease in the deflection amount of the coned disc spring 12.

In the diaphragm spring 7 as seen from FIG. 3, the deflection load increases from a value M to a value N and then decreases to the value M with a decrease in the deflection amount from a value P through a value Q to a value R. On the other hand, with a change in the foregoing deflection amount, the deflection load of the coned disc spring 12 increases from zero to a value n in a direction (negative direction) opposite to the load of the diaphragm spring 7 and then decreases to zero. Accordingly, the load changes of the both springs 7 & 12 counteract each other, so that a total load of the combined structure of the both springs 7 & 12 (diaphragm spring mechanism) becomes an approximately constant value M as illustrated by a broken line C within the foregoing deflection section (P to R).

In the structure of FIG. 1, the deflection amount of the both springs 7 & 12 under a non-worn state of the facing 3 is so set as to become the initial value P, and the deflection amount thereof at a time of the worn value of the facing 3 reaching a prescribed limit value is so set as to become said final value R or a value near to it. Accordingly, even when the clutch is used from its new state to a state where the facing 3 is worn to its wear limit, the total load of the diaphragm spring mechanism does not change so that a pressing force of the facing 3 and a treading force of a clutch pedal are maintained at approximately constant values.

Further, the coned disc spring 12 becomes entirely (or nearly) uncompressed under the clutch disengaged state in the foregoing structure. However, since the coned disc spring 12 fits onto the stud pin 10 at its opening 13, the coned disc spring 12 rotates together with the stud pin 10 and the clutch cover 6 so that there is no chance for the coned disc spring 12 to rotate independently.

Furthermore, axial positions of the both springs 7 & 12 are defined correctly by the wire rings 15, 16 & 17 and the coned disc spring 12 is seated on the diaphragm spring 7 only through the wire ring 16, so that the axial position of the coned disc spring 12 in relation to the diaphragm spring 7 is also defined correctly. As the result, the load characteristic of the coned disc spring 12 is set correctly so that the load characteristic of the diaphragm mechanism can also be set correctly.

According to the embodiment as described above, in the clutch cover assembly intending to stabilize the load characteristic by using the coned disc spring 12; the rotation of the coned disc spring 12 can be avoided and at the same time the accuracy of axial positioning thereof can be improved. Consequently, generation of abnormal sound can be controlled and a mechanism having stabilized working characteristic can be obtained.

In addition, since the bent portion 21 is formed at the tip end of the coned disc spring 12, the load characteristic of the coned disc spring 12 can be adjusted by only changing an axial length of the bent portion 21. Therefore, the load characteristic of the coned disc spring 12 and the entire diaphragm spring mechanism can be set easily and correctly.

The structure of this embodiment can be changed as described below:

The bent portion 21 can be formed on the entire circumference of the coned disc spring 12, and the bent portion 21 can be disused by using the wire ring 16 of small diameter.

Figure 4:
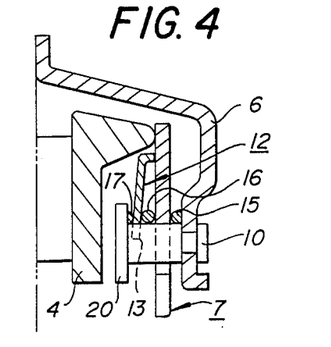
FIGS. 4 & 5 are schematic sectional partial views showing alternate structures of the embodiment of FIG. 1., respectively.

Further, as illustrated by FIG. 4, semi-circular wire rings are used for the wire rings 15 & 17 so that their flat external faces can be seated on the clutch cover 6 and an end face of the flange 20. In this structure, an axial length of the diaphragm spring mechanism comprising the wire ring 15 through 17 and the stud pin 10 etc. can be shortened.

Figure 5:
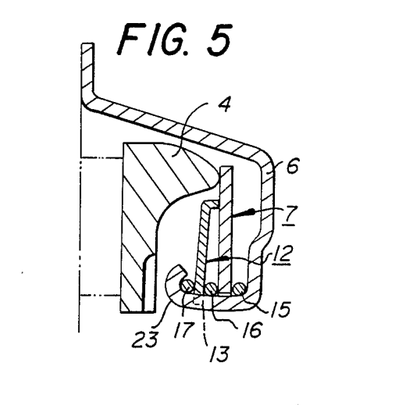

Moreover, as illustrated by FIG. 5, a bent tab 23 integral with the clutch cover 6 can be used as the wire ring supporting member in place of the stud pin 10 of FIG. 1.

In the structure of FIG. 1, the opening 13 of the coned disc spring 12 fitting onto the stud pin 10 is made into the closed (having an edge portion) structure over the entire circumference. Howevr, as shown by FIG. 4 and FIG. 5, the opening 13 can also be made into a structure opening to an inner peripheral side of the coned disc spring 12.

Figures 6, 7, 8:
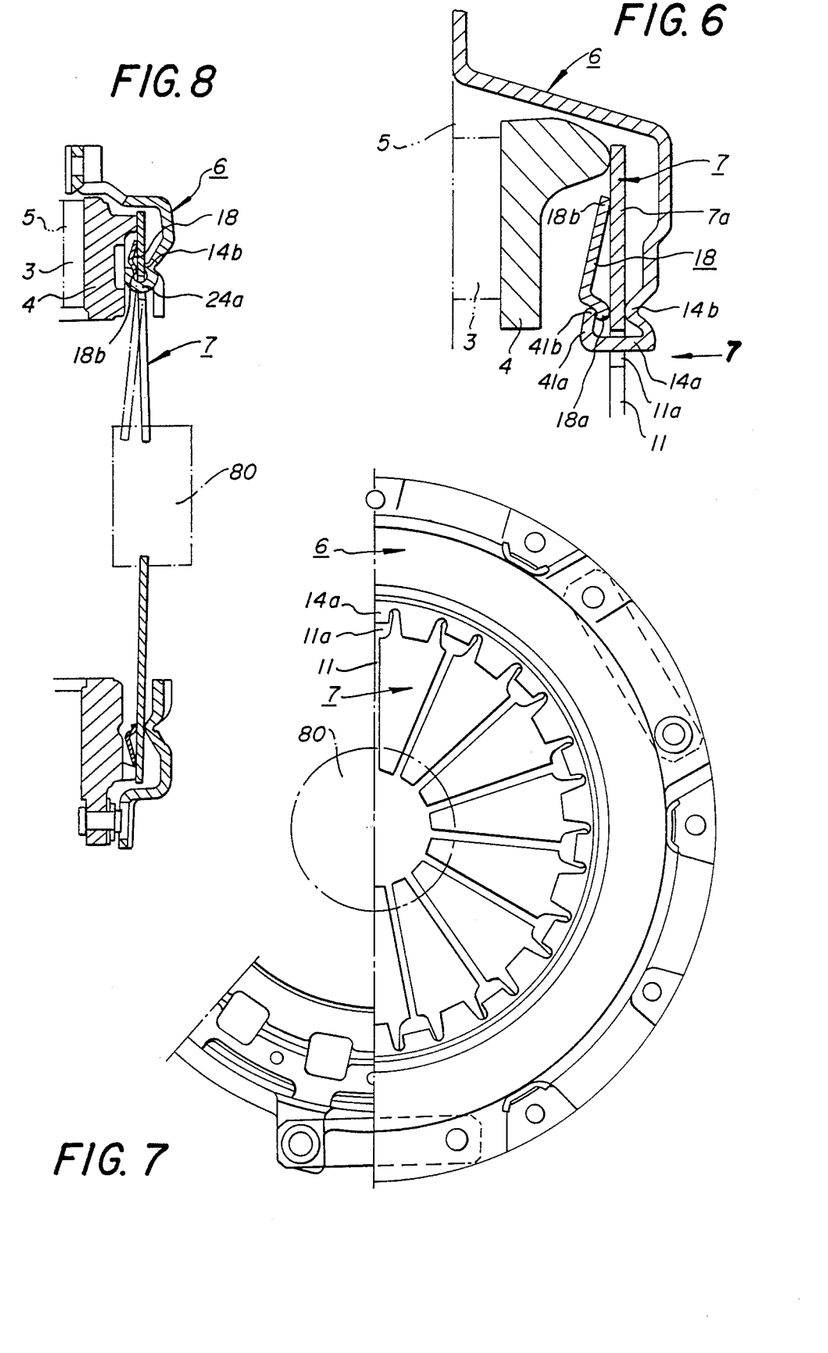
FIG. 6 is a vertical sectional partial view of another embodiment.
FIG. 7 is a general view viewed in a direction of arrow VII of FIG. 6.
FIG. 8 is a vertical sectional view showing an alternate structure of the embodiment of FIG. 6.

FIG. 6 and FIG. 7 show another embodiment. FIG. 7 is the general view viewed in the arrow VII of FIG. 6.

In these figures, parts and components corresponding to FIG. 1 are attached with the same symbols. A projected supporting portions 14a protruding in parallel with the axis to the pressure plate 4 side are provided at plural places of an inner peripheral edge of the clutch cover 6 with circumferential spaces left therebetween, i.e. at places corresponding to slitted holes 11a formed by expanding end portions at radial outside of slits 11 of the diaphragm spring 7 as illustrated by FIG. 7, and the projected supporting portions 14a pass through the slitted holes 11a. Further, an annular convex portion 14b, which protrudes in an L-shape toward the diaphragm spring 7 side by a height about half of protruding height of the projected supporting portion 14a, is provided at an inner peripheral part of the clutch cover 6 on a radial outside of the projected supporting portion 14a.

An annular coned disc spring 18 having an L-shape section protruding toward the pressure plate 4 side is disposed between an outer peripheral part 7a of the diaphragm spring 7 and the pressure plate 4. An inner peripheral edge 18a of the coned disc spring 18 is curved into a convex portion in its section toward the diaphragm spring 7 side, and a tip end edge 41b of a tip end 41a of the projected supporting portion 14a bent outwardly in its radial direction is crimped with the convex portion in such a manner as being fitted from the pressure plate 4 side. A peak of said convex portion contacts from the pressure plate 4 side with the diaphragm spring 7 at a position identical with that where a peak of an annular convex portion 14b contacts with the diaphragm spring 7.

In this way, a supporting mechanism is composed of the annular convex portion 14b and the inner peripheral edge 18a. An outer peripheral edge 18b of the coned disc spring 18 is pressed on a place neighboring an outer periphery of the diaphragm spring 7, and the coned disc spring 18 is adapted to urge an outer peripheral part 7a of the diaphragm spring 7 by its deflection force to the clutch cover 6 side in the axial direction.

In the clutch cover assembly having such a structure; when a release bearing mechanism 80 (FIG. 7) coupled to an inner peripheral edge of the diaphragm spring 7 is pushed in the axial direction toward the flywheel 5 side in order for disengaging the clutch, the diaphragm spring 7 pivots on a part which is held from both sides by the annular convex portion 14b and the tip end edge 41b of the projected supporting portion 14a through the inner peripheral edge 18a of the coned disc spring 18, thus the outer peripheral part 7a becoming shifted toward the clutch cover 6 side.

Further, under the clutch engaged state, the axial position of the pressure plate 4 is shifted to the flywheel 5 side when the facing 3 is worn out, this causes the position of the outer peripheral part 7a of the diaphragm spring 7 to be shifted in the same direction. Since the diaphragm spring 7 is pivoted on the part held by the annular convex portion 14b and the tip end edge 41b of the projected supporting portion 14a through the inner peripheral edge 18a of the coned disc spring 18, the inner peripheral edge (the part contacting with the release bearing 8) of the diaphragm spring 7 moves in a direction opposite to its outer peripheral part 7a so that the deflection amount of the diaphragm spring 7 becomes small.

On the other hand, the inner peripheral edge 18a of the coned disc spring 18 is under immovable state in the axial direction because the tip end edge 41b of the projected supporting portion 14a is crimped from the pressure plate 4 side and the inner peripheral edge is contacted with and secured to the diaphragm spring 7 to form the fulcrum of the diaphragm spring 7. For this reason, when the outer peripheral part 7a of the diaphragm spring 7 moves as described above, the coned disc spring 18 is compressed in the axial direction so that its deflection amount increases.

Incidentally, the deflection/load characteristic curves of the diaphragm spring 7 and the coned disc spring 18 are as shown in FIG. 3 samely with the embodiment of FIG. 1. Namely, the diaphragm spring 7 has a characteristic that its load changes relatively to its deflection as shown by the solid line A, and the coned disc spring 18 has a characteristic that its urging load on the diaphragm spring 7 changes correspondingly to a change in the deflection of the diaphragm spring 7 as shown by the solid line B.

Consequently, the change in loads of the diaphragm spring 7 and the coned disc spring 18 counteract each other so that a change in load of the diaphragm spring 7 in relation to the pressure plate 4 is altered from the solid line A to the broken line C. Therefore, the excessive pressing force in the clutch engaged state can be eliminated nearly entirely and the increase in the required treading force of clutch pedal can be controlled.

Further, since the inner peripheral edge 18a of the coned disc spring 18 is contacted with and secured to the diaphragm spring 7, in such the manner that the tip end edge 41b of the projected supporting portion 14a is fitted in and crimped to its convex portion from the pressure plate 4 side, the coned disc spring 18 is secured firmly. Accordingly, cracking and breakage of the coned disc spring 18 can be avoided and the increase is required treading force of clutch pedal can be controlled surely. Moreover, abnormal sounds due to axial vibration of the coned disc spring 18 can be prevented from arising because the inner peripheral edge 18a of the coned disc spring 18 is secured without leaving any clearance in between the tip end edge 41b of the projected supporting portion 14a and the outer peripheral part 7a of the diaphragm spring 7.

Furthermore, according to the above-mentioned structure, the diaphragm spring 7 can be supported by the fulcrum mechanism through means of the simple structure without using the wire rings of the embodiment of FIG. 1.

In addition, a forming work of the annular convex portion 14b and a crimping work of the inner peripheral edge 18a of the coned disc spring 18 are comparatively simple, so that manufacture of the clutch can be simplified.

Incidentally, in the foregoing embodiment the projected supporting portion 14a is so formed as to protrude axially toward the pressure plate 4 side and the tip end 41a is bent outwardly in the radial direction. However, this may be formed into a shape such as an approximately U-section curved toward the inner peripheral part of the diaphragm spring 7 as illustrated by a projected supporting portion 24a of FIG. 8. In this case, the inner peripheral edge 18a of the coned disc spring 18 becomes crimped by the tip end curved toward the radial outside so that the same effect as the foregoing embodiment can be obtained.

Figure 9:
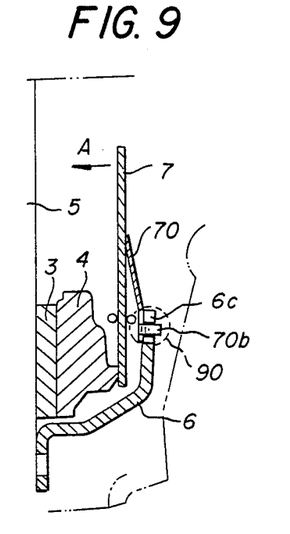
FIG. 9 is a vertical sectional partial view of a further another embodiment.
Figure 10:
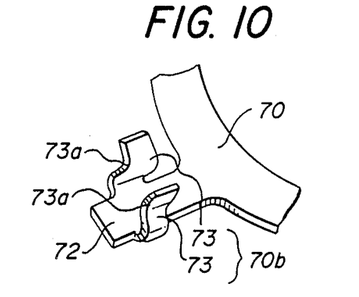
FIG. 10 is a partial oblique view of a coned disc spring of the embodiment of FIG. 9.
Figure 11:
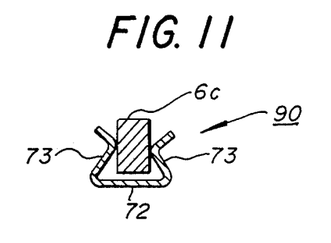
FIG. 11 is a cross-sectional view of a locking means of the embodiment of FIG. 9.

FIG. 9 through FIG. 11 show further another embodiment. In this embodiment, the coned disc spring is locked rotatively to the clutch cover at its outer peripheral edge. FIG. 10 is the partial oblique view of the coned disc spring, and FIG. 11 is the cross-sectional view of the locking part. In these figures, parts and components corresponding to those of FIG. 1 and FIG. 6 are attached with the same symbols. 72 is a projecting piece provided integrally with a coned disc spring 70 and radially outwardly at plural places (three places, for example) of an outer periphery of the coned disc spring 70. 70b is a locking claw means composed of a pair of leaf-spring-like projections 73 & 73 provided integrally with the projecting piece 72 at circumferential both sides of the projecting piece 72 in such a manner as protruding toward the clutch cover 6 side. The leaf-spring-like projections 73 & 73 face each other in the circumferential direction and their intermediate portions of projection protrude toward each other into L-shapes. 73a is a peak of the part protruding toward the opponent of the leaf-spring-like projection 73. 6c is a projection provided on an inner periphery of the clutch cover 6 in such a manner as protruding inwardly in the radial direction and integrally with the clutch cover 6, and installed in the same quantity as the locking claw means 70. The projection 6c has a shape contacted with and held by peaks 73a & 73a between the pair of the leaf-spring-like projections 73 & 73, i.e. a rectangular section having flat planes contacting with the peaks 73a & 73a. 90 is a locking means composed of a pair of the leaf-spring-like projections 73 & 73, the projecting piece 72 and the projection 6c. In this embodiment, the projection 6c of the clutch cover 6 is resiliently held between the leaf-spring-like projections 73 & 73 of the locking claw means 70b of the coned disc spring 70 in such a manner as contacting with the peaks 73a & 73a, so that the coned disc spring 70 is locked irrotationally to the clutch cover 6. Incidentally, deflection/load characteristics of the diaphragm spring 7 and the coned disc spring 70 are as shown by FIG. 3 samely as the embodiments of FIG. 1 and FIG. 6. Accordingly, a change in load of the diaphragm spring 7 due to wear of the facing 3 is counteracted by a change in load of the coned disc spring 70 so that an excessive pressing force produced during the use of the clutch can be controlled practically.

In such an embodiment, when the inner peripheral part of the diaphragm spring 7 is pushed in a direction of arrow A of FIG. 9 in order to disengage the clutch, a clearance is produced between the inner peripheral edge of the coned disc spring 70 and the diaphragm spring 7, so that the coned disc spring 70 becomes liable to vibrate because the coned disc spring 70 has a play in the axial direction. However, engine vibrations etc., which are transmitted through the clutch cover 6 to the coned disc spring 70 and through the projection 6c to the projecting piece 72 and the leaf-spring-like projection 73, are moderated by elasticity of the leaf-spring-like projections 73 & 73 holding the projection 6c. Further, no slapping is produced between the both projections because the leaf-spring-like projections 73 & 73 press on the projection 6c from both sides to allow no clearance exist between the leaf-spring-like projections 73 & 73 and the projection 6c. Moreover, the leaf-spring-like projections 73 & 73 holding the projection 6c has the elasticity so that the coned disc spring 70 can move freely to some extent in the circumferential direction at time when the diaphragm spring 7 works.

Therefore, according to this embodiment, abnormal sounds due to slapping produced between the both projections can be controlled because no clearance exists between the leaf-spring-like projections 73 & 73 and the projection 6c even when the diaphragm spring 7 is operated in the clutch releasing direction. Since no slapping is produced between the leaf-spring-like projections 73 & 73 and the projection 6c; a pair of the leaf-spring-like projections 73 & 73, the projecting piece 72 and the projection 6c can be prevented from being worn out, i.e. wear of the locking means 90 can be avoided. Further, because of the elasticity of the leaf-spring-like projection 73, there is no possibility that a rigid locking of the coned disc spring 70 with the clutch cover 6 causes a worsening of characteristic of the diaphragm spring 7 to fail to obtain the required characteristic or a worsening of durability of the locking means. Moreover, the projection 6c is provided at the side of the clutch cover 6 which is a large-sized component, and the locking claw means 70b troublesome in manufacturing as compared with the projection 6c is provided at the side of the coned disc spring 70 which is a small-sized component. In addition, a dimension between the leaf-spring-like projections 73 & 73 of the locking claw means 70b can be changed easily even after a forming work by changing projecting amounts to each other, so that it becomes unnecessary to form the locking means 70b with an exact dimension left therebetween. Accordingly, the forming work becomes simplified.

Figure 12:
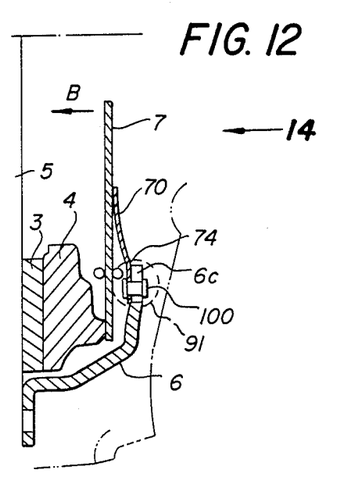
FIG. 12 is a vertical sectional partial view showing an alternate structure of the embodiment of FIG. 9.
Figure 13:
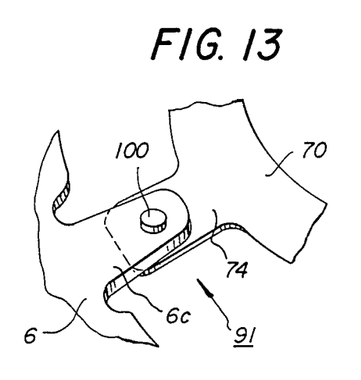
FIG. 13 is an oblique view of the locking means of an embodiment of FIG. 2.
Figure 14:
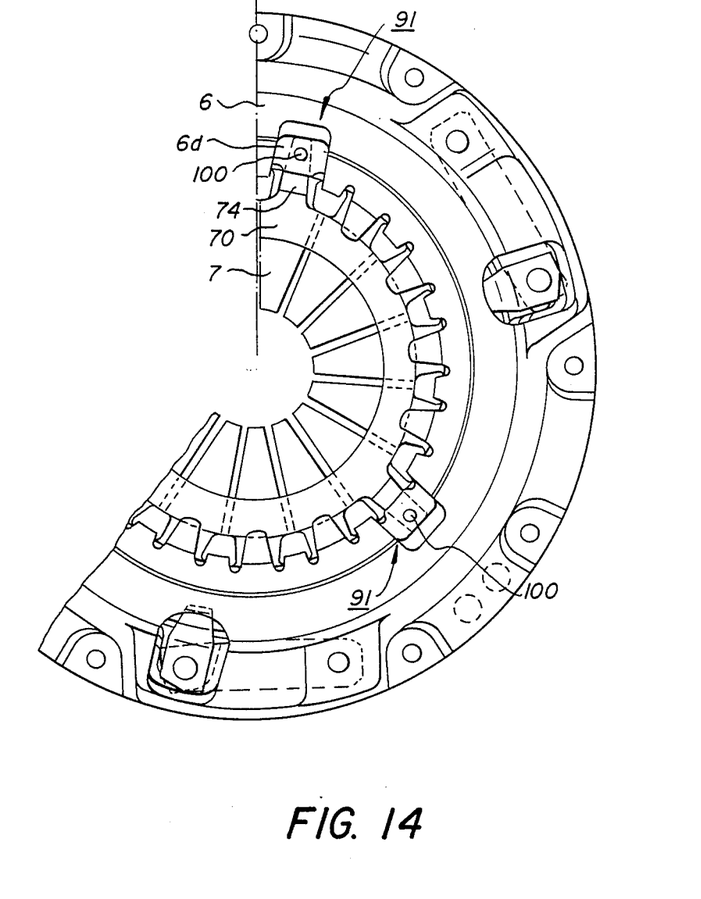
FIG. 14 is a general view viewed in a direction of XIV of FIG. 12.

FIG. 12 through FIG. 14 show an alternate structure of the foregoing embodiment. FIG. 13 is the oblique view of the locking means. FIG. 14 is the general view viewed in an arrow XIV of FIG. 12. In these figures, parts and components corresponding to FIG. 9 through FIG. 11 are attached with the same symbols. 74 is a projecting piece provided at plural places of an outer periphery of the coned disc spring 70, i.e. provided integrally with the coned disc spring 70 in such a manner as projecting outwardly in the radial direction at three places in this case. 6d is a projecting piece provided integrally with the clutch cover 6 on an inner periphery of the clutch cover in such a manner as projecting inwardly in the radial direction, and the projecting piece 6d is provided in the same quantity as the projecting piece 74. 100 is a rivet fastening the projecting piece 74 with the projecting piece 6d, and 91 is a locking means composed of the both projecting pieces 74 & 6d and the rivet 100. In this embodiment, the projecting piece 74 is secured, i.e. rivetted, integrally to the projecting piece 6d by the rivet 10 so as to lock the coned disc spring 70 relatively to the clutch cover 6.

Even in this embodiment, when the inner peripheral part of the diaphragm spring 7 is pushed in a direction of arrow B of FIG. 12, the coned disc spring 70 becomes liable to vibrate due to a play produced in the axial direction. However, even though engine vibrations etc. are transmitted through the clutch cover 6, the projecting piece 74 is fastened integrally to the projecting piece 6d by the rivet 100 to allow no clearance exist between the both projecting pieces so that no slap is produced between the projecting piece 74 and the projecting piece 6d.

Therefore, even in this embodiment, abnormal sounds due to slapping produced between the both projecting pieces can be controlled because there is no clearance between the projecting piece 74 and the projecting piece 6d even when the diaphragm spring 7 is operated in the direction to release the clutch. Further, since no slap is produced between the projecting piece 74 and the projecting piece 6d, wear of the both projecting pieces 74 & 6d, i.e. a locking means 91, can be controlled. Moreover, the both projecting pieces 74 & 6d can be manufactured easily because they can be formed by only being projected.

Industrial applicability

As described above, this invention can be utilized effectively for controlling the abnormal sounds caused by vibrations of the coned disc spring in the clutch cover assembly equipped with the diaphragm spring and the coned disc spring.

What is claimed is:

1. A clutch cover assembly, in which an outer peripheral edge of a diaphragm spring is pressed on a pressure plate; an inner peripheral edge of said diaphragm spring is connected to a release bearing mechanism; a disc-like annular coned disc spring is non-rotatably disposed at an axial one-side of the diaphragm spring; the coned disc spring is secured to a clutch cover in such a manner that circumferential plural places of the coned disc spring are provided so as not to leave any play relative to projecting portions of the clutch cover at least in an axial and a circumferential direction of said clutch cover; the coned disc spring is so installed that an outer peripheral edge and an inner peripheral edge thereof contacts with the diaphragm spring to urge the diaphragm spring in a direction to disengage a clutch at a time when the clutch is engaged; and a radial intermediate portion of the diaphragm spring is supported by the clutch cover through a fulcrum mechanism.

2. A clutch cover assembly, in which an outer peripheral edge of a diaphragm spring is pressed on a pressure plate; an inner peripheral edge of said diaphragm spring is connected to a release bearing mechanism; a disc-like annular coned disc spring is disposed between the diaphragm spring and the pressure plate; projected supporting portions, which protrude toward the pressure plate through notches provided at radial intermediate portions of said springs, are installed at plural places of an inner peripheral edge of a clutch cover with spaces left therebetween in a circumferential direction, said projected supporting portions preventing said coned disc spring from rotating circumferentially on said clutch cover; three wire rings are installed which are supported by the projected supporting portions in such a manner as to be immovable in both radial and axial directions; the three wire rings are disposed alternately with said springs in the axial direction to allow the wire rings to be seated on both side faces of respective springs so that they compose a fulcrum mechanism; and the coned disc spring is so installed that an outer peripheral edge thereof contacts with an outer peripheral part of the diaphragm spring to urge said diaphragm spring in a direction of disengaging a clutch when the clutch is engaged.

3. A clutch cover assembly as set forth in claim 2, in which a bent portion is provided on an outer peripheral edge of the coned disc spring, and a tip end of said bent portion is in contact with the diaphragm spring.

4. A clutch cover assembly as set forth in claim 2, in which two wire rings at opposite axial ends of the projected supporting portion have semi-circular sections.

5. A clutch cover assembly, in which an outer peripheral edge of a diaphragm spring is pressed on a pressure plate; an inner peripheral edge of said diaphragm spring is connected to a release bearing mechanism; projected supporting portions, which protrude toward the pressure plate through notches provided at radial intermediate portions of the diaphragm spring, are installed at plural places of an inner peripheral edge of a clutch cover with spaces left therebetween in a circumferential direction; an annular convex portion protruding toward the diaphragm spring is provided on an inner peripheral part of the clutch cover at a place radially outward of the projected supporting portion; an annular coned disc spring, which has an approximately L-shaped cross section protruding toward the pressure plate, is non-rotatably disposed between an outer peripheral part of the diaphragm spring and the pressure plate; an inner peripheral edge of the coned disc spring is curved so that a section of said coned disc spring becomes convex toward the diaphragm spring; a radially outwardly bent tip end of said projected supporting portion is fitted in and crimped to the convex portion of said inner peripheral edge from the pressure plate side to hold the diaphragm spring at the same position from both sides by means of said annular convex portion and said inner peripheral part so that they compose a fulcrum mechanism; and the coned disc spring is so installed that an outer peripheral edge thereof contacts with an outer peripheral part of the diaphragm spring to urge said diaphragm spring in a direction of disengaging a clutch when the clutch is engaged.

6. A clutch cover assembly, in which an outer peripheral edge of a diaphragm spring is pressed on a pressure plate; an inner peripheral edge of said diaphragm spring is connected to a release bearing mechanism; a radial intermediate portion of the diaphragm spring is supported by the clutch cover through a fulcrum mechanism; a disc-like annular coned disc spring is disposed between the clutch cover and the diaphragm spring; a pair of leaf-springlike projections, which face each other in a circumferential direction and protrude toward the clutch cover, are installed at plural places of an outer periphery of the coned disc spring; a projection on an inner periphery of the clutch cover is resiliently held by said leaf-springlike projections said leaf-springlike projections preventing said coned disc spring from rotating relative to said clutch cover; and the coned disc spring is so installed that an inner peripheral edge thereof contacts with an inner peripheral part of the diaphragm spring to urge said diaphragm spring in a direction of disengaging the clutch when the clutch is engaged.

7. A clutch cover assembly, in which an outer peripheral edge of a diaphragm spring is pressed on a pressure plate; an inner peripheral edge of said diaphragm spring is connected to a release bearing mechanism; a radial intermediate portion of the diaphragm spring is supported by the clutch cover through a fulcrum mechanism; a disc-like annular coned disc spring is disposed between the clutch cover and the diaphragm spring; radially outwardly projecting pieces, which are provided at plural places of an outer periphery of the coned disc spring, are rivetted to radially inwardly projecting pieces provided on an inner periphery of the clutch cover, said projecting pieces preventing said coned disc spring from rotating relative to said clutch cover; and the coned disc spring is so installed that an inner peripheral edge of said clutch cover contacts with an inner peripheral part of the diaphragm spring to urge said diaphragm spring in a direction of disengaging a clutch when the clutch is engaged.

* * * * *